(12) United States Patent
Sun

(10) Patent No.: US 11,353,250 B2
(45) Date of Patent: Jun. 7, 2022

(54) VERTICAL OIL SEPARATOR

(71) Applicant: Heatcraft Refrigeration Products LLC, Stone Mountain, GA (US)

(72) Inventor: Xi Sun, Snellville, GA (US)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 250 days.

(21) Appl. No.: 16/739,297

(22) Filed: Jan. 10, 2020

(65) Prior Publication Data

US 2021/0215412 A1   Jul. 15, 2021

(51) Int. Cl.
*F25B 43/02* (2006.01)
*F25B 31/00* (2006.01)

(52) U.S. Cl.
CPC ............ *F25B 43/02* (2013.01); *F25B 31/004* (2013.01); *F25B 2400/02* (2013.01); *F25B 2400/07* (2013.01)

(58) Field of Classification Search
CPC .... F25B 43/02; F25B 2400/02; F25B 31/004; F25B 2400/07; F25B 2400/23
See application file for complete search history.

(56) References Cited

U.S. PATENT DOCUMENTS

| | | | | |
|---|---|---|---|---|
| 4,506,523 A | * | 3/1985 | DiCarlo | F04B 39/16 62/470 |
| 4,516,994 A | | 5/1985 | Kocher | |
| 4,690,759 A | * | 9/1987 | Mandy | B01D 45/14 210/304 |
| 4,906,264 A | * | 3/1990 | Szymaszek | B01D 17/045 55/324 |
| 5,113,671 A | * | 5/1992 | Westermeyer | F25B 43/02 62/468 |
| 5,404,730 A | * | 4/1995 | Westermeyer | F25B 43/02 62/84 |
| 5,502,984 A | * | 4/1996 | Boehde | B01D 45/12 210/512.1 |
| 5,551,253 A | * | 9/1996 | Kim | F25B 43/02 62/470 |
| 6,497,114 B1 | * | 12/2002 | Strikis | F04B 27/109 210/167.02 |

(Continued)

FOREIGN PATENT DOCUMENTS

DE   112015003818 T5   5/2017
GB   2158562 A   11/1985

(Continued)

OTHER PUBLICATIONS

European Patent Office, Extended Search Report, Application No. 2021522.1, dated Jun. 8, 2021, 5 pages.

*Primary Examiner* — Joseph F Trpisovsky
(74) *Attorney, Agent, or Firm* — Baker Botts L.L.P.

(57) ABSTRACT

An unconventional oil separator includes a vertical design. Generally, a refrigerant enters the vertical oil separator and spins downwards. The oil separator includes plates within the oil separator that either maintain the spin of the refrigerant or reverse the spin of the refrigerant, which causes oil in the refrigerant to separate from the refrigerant. A vertical outlet allows refrigerant that spins towards the bottom of the oil separator to travel back towards the top and out of the oil separator. Separated oil is collected at the bottom of the oil separator.

20 Claims, 6 Drawing Sheets

(56) References Cited

U.S. PATENT DOCUMENTS

| | | | | |
|---|---|---|---|---|
| 2002/0095948 | A1* | 7/2002 | Corrigan | F25B 43/006 |
| | | | | 62/503 |
| 2002/0134102 | A1* | 9/2002 | Morimoto | F25B 13/00 |
| | | | | 62/470 |
| 2011/0056379 | A1* | 3/2011 | Lucas | B01D 45/12 |
| | | | | 96/216 |
| 2012/0011872 | A1* | 1/2012 | Dugast | F25B 43/02 |
| | | | | 62/238.6 |
| 2016/0136555 | A1* | 5/2016 | Yoshioka | F04B 39/023 |
| | | | | 62/470 |
| 2016/0313038 | A1* | 10/2016 | Young | B01D 45/12 |
| 2017/0051957 | A1* | 2/2017 | Shimasaki | B01D 17/0217 |
| 2017/0184331 | A1* | 6/2017 | Kurokawa | F25B 43/02 |
| 2017/0276415 | A1* | 9/2017 | Ishiyama | F25B 43/02 |
| 2018/0038618 | A1* | 2/2018 | Hartfield | B01D 45/12 |
| 2018/0259274 | A1 | 9/2018 | Sun et al. | |
| 2019/0120231 | A1* | 4/2019 | Obrist | F04B 53/22 |

FOREIGN PATENT DOCUMENTS

| | | |
|---|---|---|
| KR | 19990018328 U | 6/1999 |
| WO | 2014012962 A1 | 1/2014 |

\* cited by examiner

VERTICAL OIL SEPARATOR

TECHNICAL FIELD

This disclosure relates generally to an oil separator.

BACKGROUND

Cooling systems cycle a refrigerant to cool various spaces. For example, a refrigeration system may cycle refrigerant to cool spaces near or around a refrigeration unit. As another example, an air conditioning system may cycle refrigerant to cool a room.

SUMMARY OF THE DISCLOSURE

Cooling systems cycle a refrigerant (e.g., carbon dioxide refrigerant) to cool various spaces. For example, a refrigeration system may cycle refrigerant to cool spaces near or around a refrigeration unit. As another example, an air conditioning system may cycle refrigerant to cool a room. These systems may include an oil separator that separates an oil that was introduced into the refrigerant (e.g., by a compressor). Conventional oil separators may present several disadvantages. For example, some oil separators require extra room to service the oil separators (e.g., to replace a core of the oil separator). As another example, some oil separators may cause a large pressure drop to occur in the system. As yet another example, some oil separators have limited capacity and/or require extra space for a separate oil reservoir to store separated oil.

This disclosure contemplates an unconventional oil separator with a vertical design. Generally, a refrigerant enters the vertical oil separator and spins downwards. The oil separator includes plates within the oil separator that either maintain the spin of the refrigerant or reverse the spin of the refrigerant, which causes oil in the refrigerant to separate from the refrigerant. A vertical outlet allows refrigerant that spins towards the bottom of the oil separator to travel back towards the top and out of the oil separator. Separated oil is collected at the bottom of the oil separator. In this manner, the oil separator has a higher capacity and lower pressure drop than conventional designs. Additionally, the oil separator occupies less space than conventional designs for an oil reservoir, because the oil collects in the bottom of the oil separator. Furthermore, servicing the oil separator requires less room than certain conventional designs. Certain embodiments of the oil separator are described below.

According to one embodiment, an oil separator includes a vertical body, a first plate, a second plate, an inlet, and an outlet. The first plate is positioned within the vertical body. The first plate defines a first chamber within the vertical body. The second plate is positioned within the vertical body. The second plate and the first plate define a second chamber within the vertical body. The second plate further defines a third chamber within the body. The second chamber is below the first chamber. The third chamber is below the second chamber. The inlet directs a refrigerant into the vertical body and into the first chamber. The refrigerant in the first chamber rotates in a first direction about a longitudinal axis of the vertical body. The first plate directs the refrigerant in the first chamber into the second chamber such that the refrigerant in the second chamber rotates in the first direction about the longitudinal axis of the vertical body and downwards towards the second plate. The second plate directs the refrigerant in the second chamber into the third chamber such that the refrigerant in the third chamber rotates in a second direction about the longitudinal axis of the vertical body and downwards towards a bottom of the vertical body. The second direction is opposite the first direction. The outlet is positioned along the longitudinal axis of the vertical body. The outlet directs the refrigerant in the third chamber upwards through the first and second chambers and out of the vertical body.

According to another embodiment, a method includes directing, by an inlet, a refrigerant into a first chamber of a vertical body such that the refrigerant in the first chamber rotates in a first direction about a longitudinal axis of the vertical body. The first chamber is defined by a first plate positioned in the vertical body. The method also includes directing, by the first plate, the refrigerant in the first chamber into a second chamber of the vertical body such that the refrigerant in the second chamber rotates in the first direction about the longitudinal axis of the vertical body. The second chamber is defined by the first plate and a second plate positioned in the vertical body. The second chamber is below the first chamber. The method further includes directing, by the second plate, the refrigerant in the second chamber into a third chamber of the vertical body such that the refrigerant in the third chamber rotates in a second direction about the longitudinal axis of the vertical body. The second direction is opposite the first direction. The third chamber is below the second chamber. The method also includes directing, by an outlet positioned along the longitudinal axis of the vertical body, the refrigerant in the third chamber upwards through the first and second chambers and out of the vertical body.

According to yet another embodiment, a system includes a high side heat exchanger, a low side heat exchanger, a compressor, and an oil separator. The high side heat exchanger removes heat from a refrigerant. The low side heat exchanger uses the refrigerant to remove heat from a space proximate the low side heat exchanger. The compressor compresses the refrigerant from the low side heat exchanger. The oil separator separates an oil from the refrigerant from the compressor. The oil separator includes a vertical body, a first plate, a second plate, an inlet, and an outlet. The first plate is positioned within the vertical body. The first plate defines a first chamber within the vertical body. The second plate is positioned within the vertical body. The second plate and the first plate define a second chamber within the vertical body. The second plate further defines a third chamber within the body. The second chamber is below the first chamber. The third chamber is below the second chamber. The inlet directs the refrigerant into the vertical body and into the first chamber. The refrigerant in the first chamber rotates in a first direction about a longitudinal axis of the vertical body. The first plate directs the refrigerant in the first chamber into the second chamber such that the refrigerant in the second chamber rotates in the first direction about the longitudinal axis of the vertical body and downwards towards the second plate. The second plate directs the refrigerant in the second chamber into the third chamber such that the refrigerant in the third chamber rotates in a second direction about the longitudinal axis of the vertical body and downwards towards a bottom of the vertical body. The second direction is opposite the first direction. The outlet is positioned along the longitudinal axis of the vertical body. The outlet directs the refrigerant in the third chamber upwards through the first and second chambers and out of the vertical body.

Certain embodiments may provide one or more technical advantages. For example, an embodiment of an oil separator has a higher capacity and lower pressure drop relative to conventional designs because of its vertical and centrifugal design. As another example, an embodiment of an oil separator occupies less space than conventional designs by integrating an oil reservoir into the oil separator. As yet another example, an embodiments of an oil separator uses less room than certain conventional designs during servicing. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
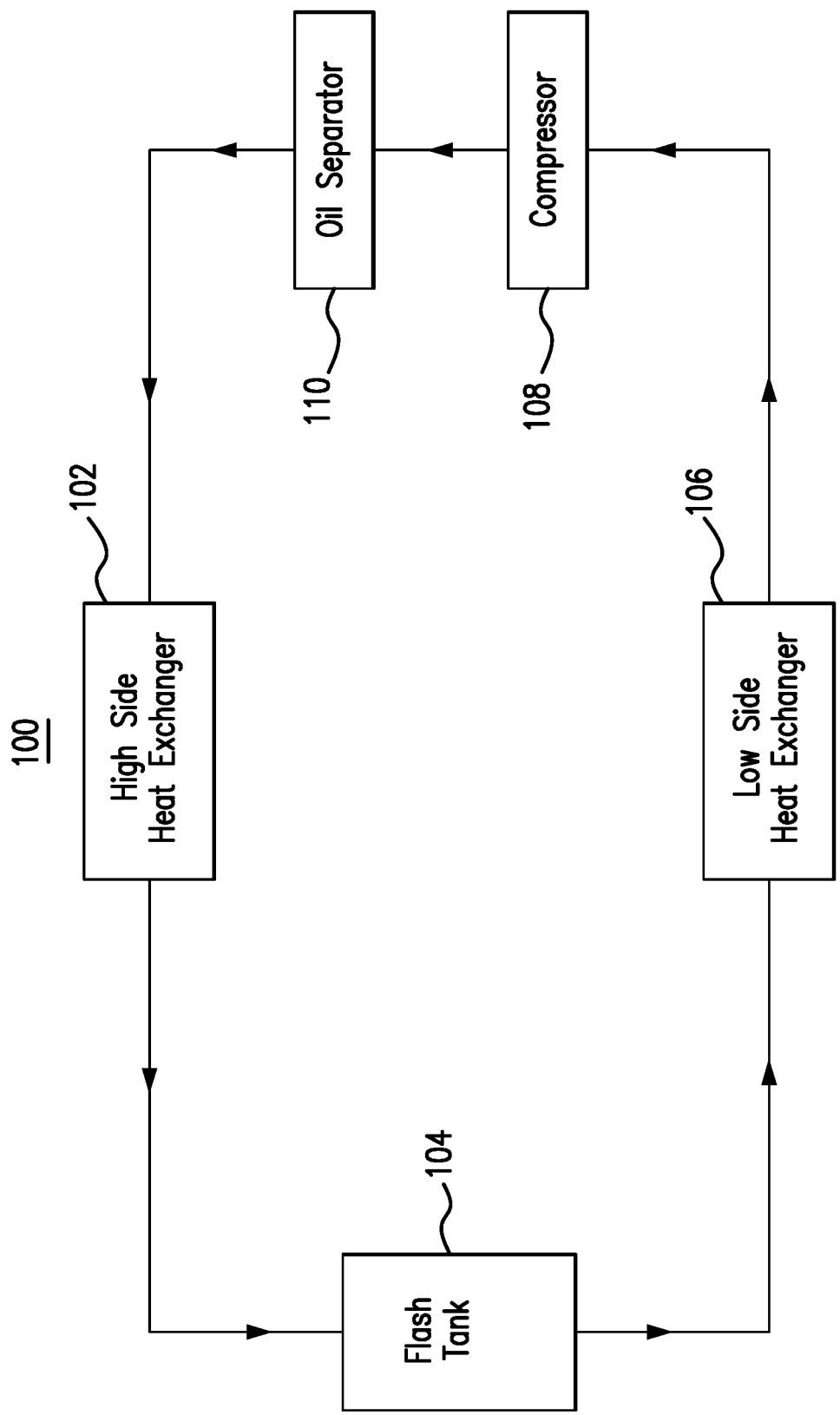
FIG. 1 illustrates an example cooling system with an oil separator, according to certain embodiments.
Figure 2A:
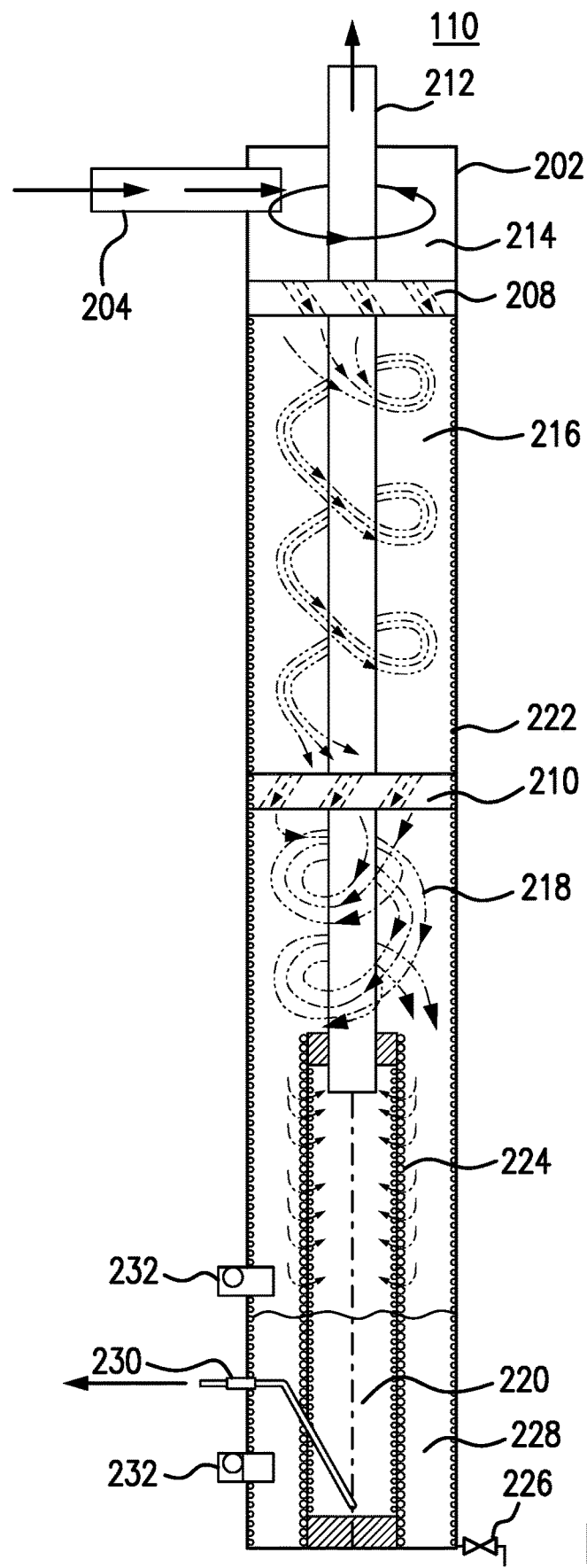
FIGS. 2A-2G illustrate certain aspects of an example oil separator of the system of FIG. 1, according to certain embodiments.
Figure 2B:
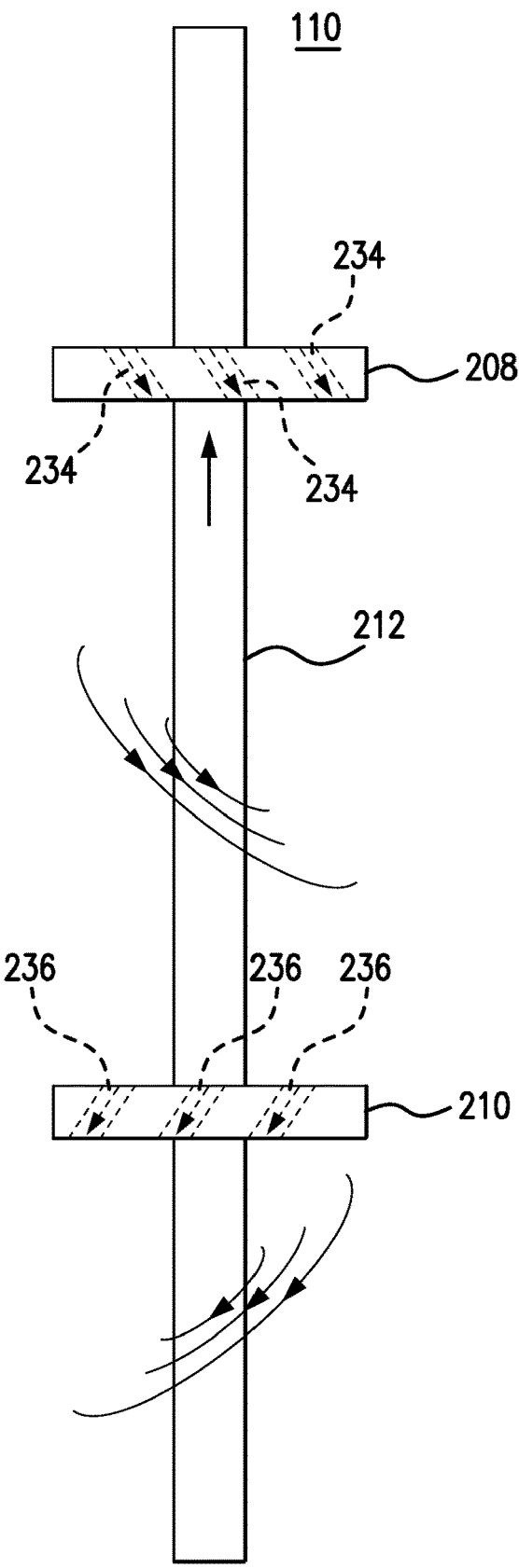
Figure 2C:
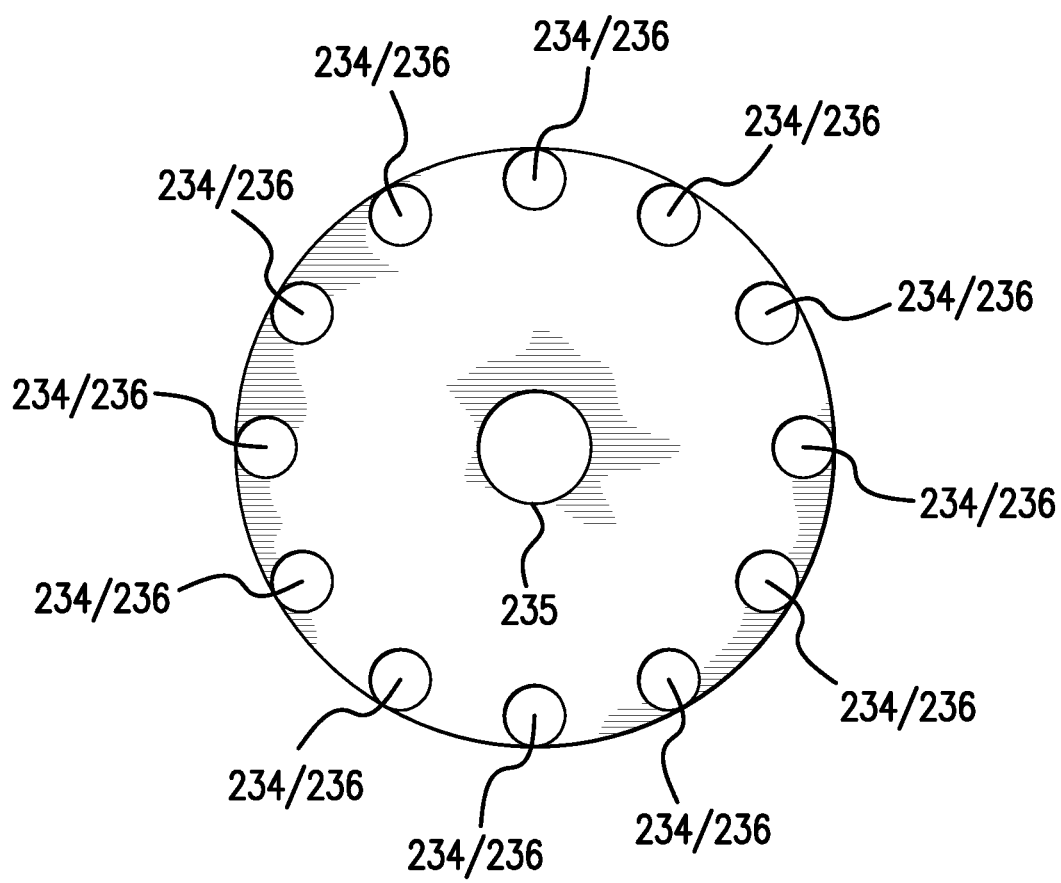
Figure 2D:
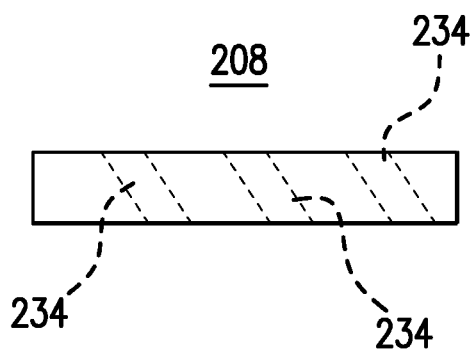
Figure 2E:
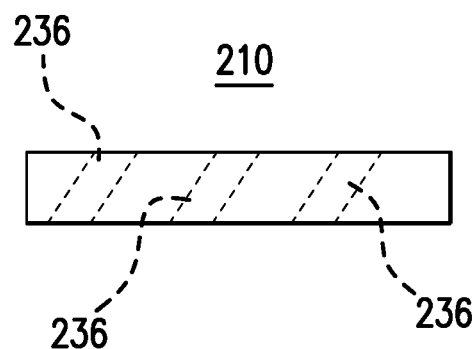
Figure 2F:
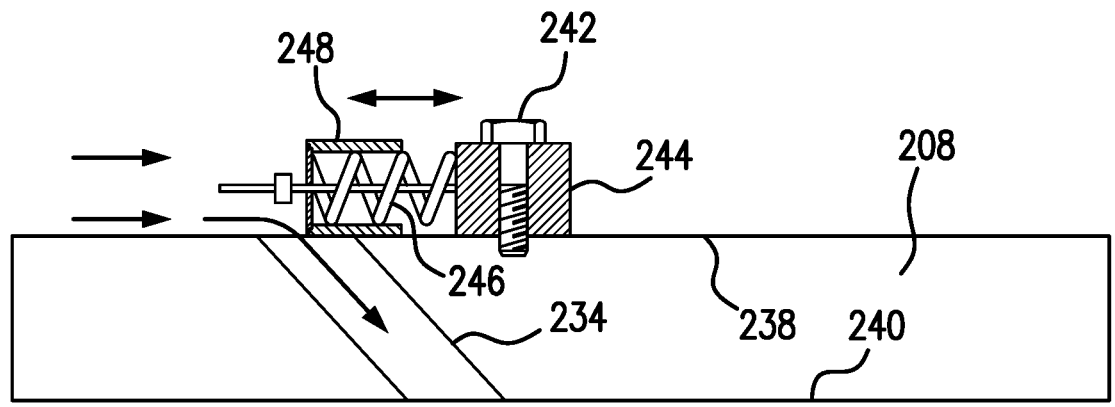
Figure 2G:
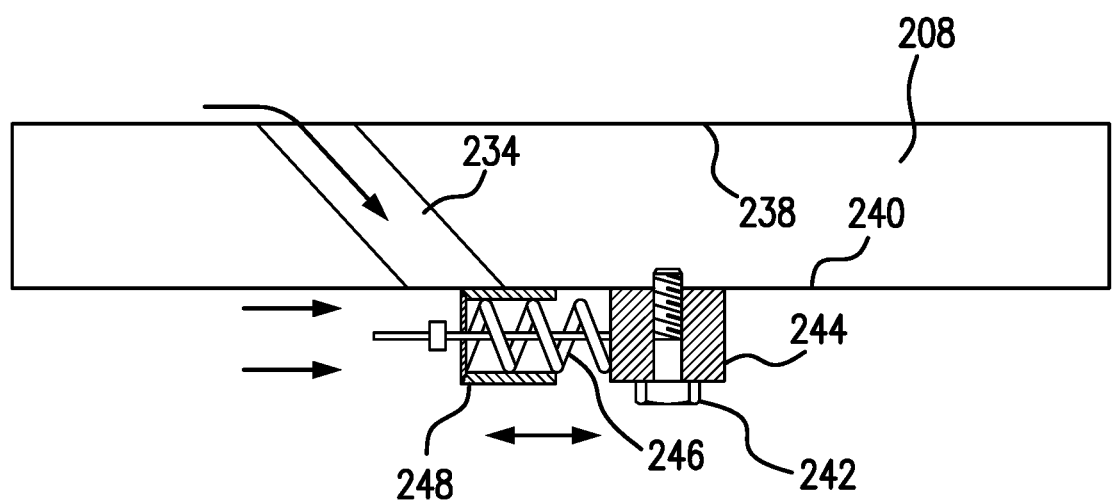
Figure 3:
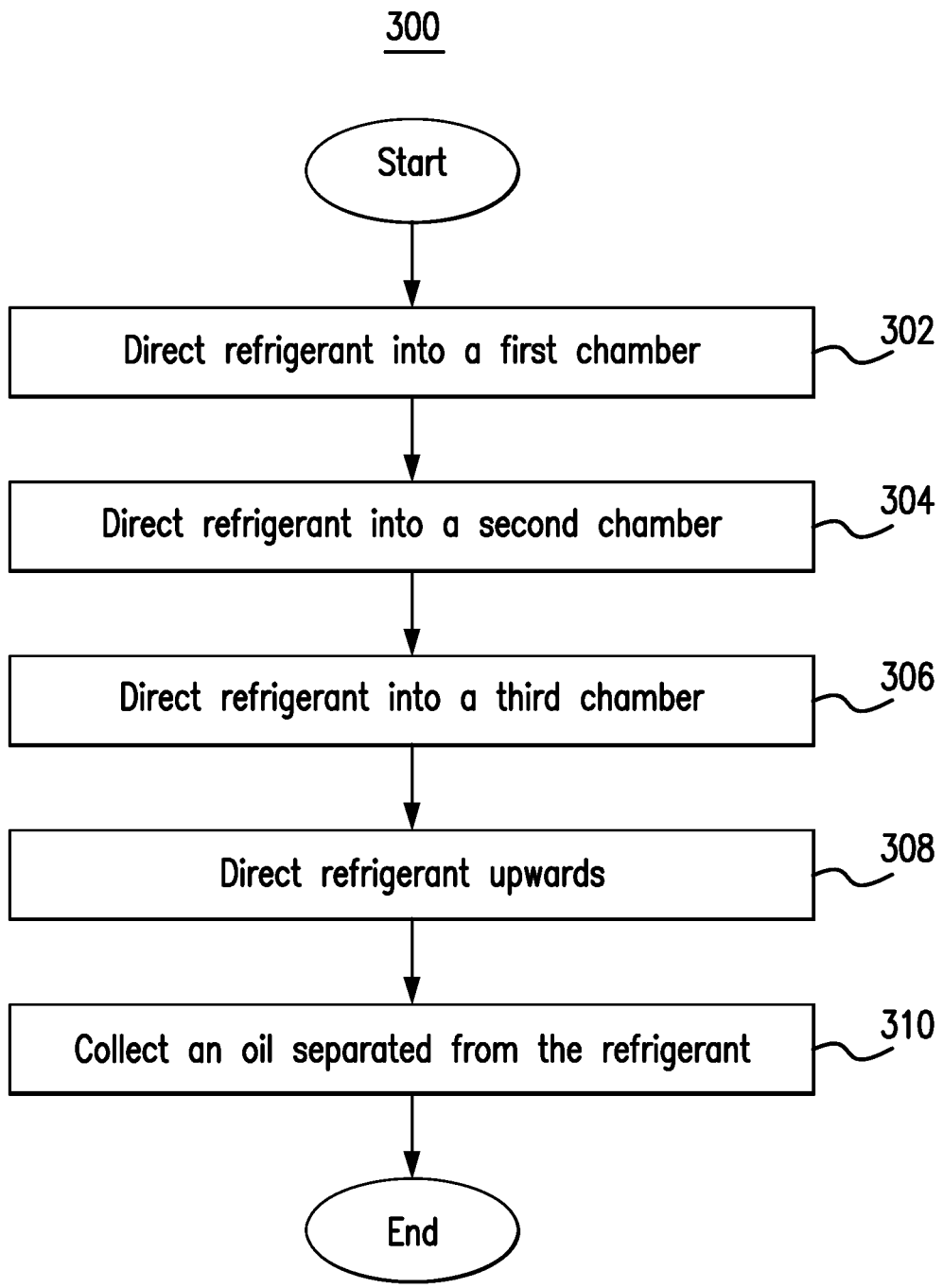
FIG. 3 is a flowchart illustrating a method of operating an example oil separator of the system of FIG. 1, according to certain embodiments.

Embodiments of the present disclosure and its advantages are best understood by referring to FIGS. 1 through 3 of the drawings, like numerals being used for like and corresponding parts of the various drawings.

Cooling systems cycle a refrigerant (e.g., carbon dioxide refrigerant) to cool various spaces. For example, a refrigeration system may cycle refrigerant to cool spaces near or around a refrigeration unit. As another example, an air conditioning system may cycle refrigerant to cool a room. These systems may include an oil separator that separates an oil that was introduced into the refrigerant (e.g., by a compressor). Conventional oil separators may present several disadvantages. For example, some oil separators require extra room to service the oil separators (e.g., to replace a core of the oil separator). As another example, some oil separators may cause a large pressure drop to occur in the system. As yet another example, some oil separators have limited capacity and/or require extra space for a separate oil reservoir to store separated oil.

This disclosure contemplates an unconventional oil separator with a vertical design. Generally, a refrigerant enters the vertical oil separator and spins downwards. The oil separator includes plates within the oil separator that either maintain the spin of the refrigerant or reverse the spin of the refrigerant, which causes oil in the refrigerant to separate from the refrigerant. A vertical outlet allows refrigerant that spins towards the bottom of the oil separator to travel back towards the top and out of the oil separator. Separated oil is collected at the bottom of the oil separator. In this manner, the oil separator has a higher capacity and lower pressure drop than conventional designs. Additionally, the oil separator takes less space than conventional designs for an oil reservoir, because the oil collects in the bottom of the oil separator. Furthermore, servicing the oil separator requires less room than certain conventional designs. The oil separator will be described in more detail using FIGS. 1 through 3.

FIG. 1 illustrates an example cooling system 100 with an oil separator 110. As shown in FIG. 1, system 100 includes a high side heat exchanger 102, a flash tank 104, a low side heat exchanger 106, a compressor 108, and an oil separator 110. System 100 may include any number of high side heat exchangers 102, flash tanks 104, low side heat exchangers 106, compressors 108, and oil separators 110. Generally, system 100 cycles a refrigerant (e.g., carbon dioxide refrigerant) to cool a space.

High side heat exchanger 102 removes heat from a refrigerant. When heat is removed from the refrigerant, the refrigerant is cooled. This disclosure contemplates high side heat exchanger 102 being operated as a condenser and/or a gas cooler. When operating as a condenser, high side heat exchanger 102 cools the refrigerant such that the state of the refrigerant changes from a gas to a liquid. When operating as a gas cooler, high side heat exchanger 102 cools gaseous refrigerant and the refrigerant remains a gas. In certain configurations, high side heat exchanger 102 is positioned such that heat removed from the refrigerant may be discharged into the air. For example, high side heat exchanger 102 may be positioned on a rooftop so that heat removed from the refrigerant may be discharged into the air. As another example, high side heat exchanger 102 may be positioned external to a building and/or on the side of a building.

Flash tank 104 stores refrigerant received from high side heat exchanger 102. This disclosure contemplates flash tank 104 storing refrigerant in any state such as, for example, a liquid state and/or a gaseous state. Refrigerant leaving flash tank 104 is fed to low side heat exchanger 106. In some embodiments, a flash gas and/or a gaseous refrigerant is released from flash tank 104. By releasing flash gas, the pressure within flash tank 104 may be reduced.

Refrigerant may flow from flash tank 104 to low side heat exchanger 106. When the refrigerant reaches low side heat exchanger 106, the refrigerant removes heat from the air around low side heat exchanger 106. As a result, the air is cooled. The cooled air may then be circulated such as, for example, by a fan to cool a space such as, for example, a freezer and/or a refrigerated shelf. As refrigerant passes through low side heat exchanger 106, the refrigerant may change from a liquid state to a gaseous state as it absorbs heat.

Refrigerant may flow from low side heat exchanger 106 to compressor 108. Compressor 108 compresses the refrigerant to increase the pressure of the refrigerant. As a result, the heat in the refrigerant may become concentrated and the refrigerant may become a high pressure gas. Compressor 108 may then send the compressed refrigerant to oil separator 110.

Compressor 110 may contain oil. The oil may mix with refrigerant passing through compressor 108, and exit compressor 108. Loss of oil may cause compressor 108 to degrade. Oil in the refrigerant passing through system 100 may also reduce the overall efficiency of the cooling system 100. For example, oil may enter high side heat exchanger 102 with the refrigerant, and cause high side heat exchanger 102 to remove heat from the refrigerant less efficiently.

Oil separator 110 may remove oil from the refrigerant of system 100. In certain embodiments, removing oil from the flow of refrigerant in system 100 prevents reductions in efficiency of the system. For example, removing oil from the refrigerant may prevent oil from entering high side heat exchanger 102 with the refrigerant, which may cause high side heat exchanger 102 to remove heat from the refrigerant less efficiently. Oil separator 110 may be of any suitable size, shape, and capacity to remove oil from the flow of refrigerant.

Conventional oil separators may present several disadvantages. For example, some oil separators require extra room to service the oil separators (e.g., to replace a core of the oil separator). As another example, some oil separators may cause a large pressure drop to occur in the system. As yet another example, some oil separators have limited capacity and/or require extra space for a separate oil reservoir to store separated oil.

Oil separator 110 includes an unconventional, vertical design that may address some of these disadvantages. Generally, a refrigerant enters oil separator 110 and spins downwards. Oil separator 110 includes plates within oil separator 110 that either maintain the spin of the refrigerant or reverse the spin of the refrigerant, which causes oil in the refrigerant to separate from the refrigerant. A vertical outlet allows refrigerant that spins towards the bottom of oil separator 110 to travel back towards the top and out of oil separator 110. Separated oil is collected at the bottom of oil separator 110. In this manner, oil separator 110 has a higher capacity and lower pressure drop than conventional designs in certain embodiments. Additionally, oil separator 110 takes less space than conventional designs for an oil reservoir in certain embodiments, because the oil collects in the bottom of oil separator 110. Furthermore, servicing oil separator 110 requires less room than certain conventional designs in particular embodiments. FIGS. 2A-2G illustrate certain aspects of oil separator 110. FIG. 3 describes a process of operating oil separator 110.

FIG. 2A illustrates oil separator 110 of system 100 of FIG. 1. As seen in FIG. 2A, oil separator 110 includes a body 202, an inlet 204, plates 208 and 210, an outlet 212, meshes 222 and 224, a drain 226, an outlet 230, and sight glasses 232. Generally, oil separator 110 separates an oil from a refrigerant by spinning the refrigerant down the inside of oil separator 110. Oil separator 110 changes the direction of the spin partway down oil separator 110, which may cause additional oil to be separated from the refrigerant. The separated oil is collected at the bottom of oil separator 110 and the refrigerant is directed through the top of oil separator 110. In certain embodiments, the vertical design of oil separator 110 allows oil separator 110 to have a higher capacity and lower pressure drop than conventional designs. Furthermore, by collecting oil at the bottom of oil separator 110, oil separator 110 occupies less space than conventional designs, which include a separate oil reservoir. Furthermore, the design of oil separator 110 results in less room being needed to service oil separator 110 relative to conventional designs.

Oil separator 110 includes body 202 that is generally vertical. As seen in FIG. 2A, body 202 forms the largest and primary structure of oil separator 110. Generally, refrigerant enters body 202 near the top of body 202. Refrigerant then rotates downwards towards the bottom of body 202. This rotation causes an oil in the refrigerant to separate from the refrigerant and drop to the bottom of body 202. The oil is collected at the bottom of body 202 and the refrigerant is directed towards the top of body 202 to exit body 202.

Body 202 may be any suitable shape. For example, body 202 may be a cylindrical shape and/or a rectangular shape. Body 202 includes a longitudinal axis 220 that extends along the vertical length of body 202. Certain components of body 202 are positioned along longitudinal axis 220. The rotation of the refrigerant within body 202 may be about longitudinal axis 220. Longitudinal axis 220 runs along the vertical length of body 202 from the top surface of body 202 to the bottom surface of body 202.

Inlet 204 is coupled to body 202 near the top surface of body 202. Inlet 204 may be a pipe or a tube that directs refrigerant into body 202. For example, inlet 204 may direct refrigerant from compressor 108 into body 202.

Plates 208 and 210 are positioned within body 202 about longitudinal axis 220. Plates 208 and 210 may be coupled to body 202 such that plates 208 and 210 are flush with the edges of body 202. In this manner, refrigerant within body 202 may not flow around plates 208 and 210, between the edges of plates 208 and 210 and body 202. As discussed later using FIGS. 2C through 2E, plates 208 and 210 include holes that allow refrigerant to flow through plates 208 and 210.

As seen in FIG. 2A, plate 208 is positioned above plate 210 in body 202. Plate 208 defines a first chamber 214 within body 202. Plates 208 and 210 define a second chamber 216 within body 202. Plate 210 defines a third chamber 218 within body 202. Chamber 214 is positioned above chambers 216 and 218. Chamber 216 is positioned above chamber 218. Generally, refrigerant in body 202 rotates within chambers 214, 216 and 218 such that an oil separates from the refrigerant.

Refrigerant enters chamber 214 through inlet 204. After refrigerant enters chamber 214, the refrigerant begins to rotate around chamber 214 about longitudinal axis 220. The initial rotation may be caused by the positioning of inlet 204 and the entry velocity of the refrigerant. When the refrigerant hits a wall of body 202, the refrigerant begins to rotate about longitudinal axis 220. In the example of FIG. 2A, the refrigerant rotates in a counterclockwise direction about longitudinal axis 220 in chamber 214. As more refrigerant is directed into chamber 214 by inlet 204, the rotating refrigerant is pushed downwards towards plate 208.

Plate 208 is coupled to the edges of body 202 such that plate 208 is flush with the edges of body 202. As a result, refrigerant in chamber 214 cannot flow around plate 208, between the edges of plate 208 and body 202. As discussed previously, plate 208 includes holes that direct the refrigerant from chamber 214 into chamber 216. These holes may be angled to maintain the rotational direction of the refrigerant. As a result, the refrigerant in chamber 216 may rotate in the same direction as the refrigerant in chamber 214 about longitudinal axis 220. In the example of FIG. 2A, the refrigerant in chamber 216 rotates in a counterclockwise direction about longitudinal axis 220. The refrigerant also continues moving downwards towards plate 210. In certain embodiments, the holes in plate 208 reduce the surface area (e.g., relative to the cross-sectional area of body 202) through which the refrigerant in chamber 214 passes to chamber 216. As a result, the velocity of the refrigerant increases as the refrigerant flows through the holes of plate 208. This increase in velocity allows the refrigerant to continue rotating downwards through chamber 216.

Refrigerant in chamber 216 rotates downwards towards plate 210. Plate 210 is positioned in body 202 below plate 208. Plate 210 may be coupled to the edges of body 202 such that plate 210 is flush with the edges of body 202. As a result, refrigerant in chamber 216 cannot flow around plate 210, between the edges of plate 210 and body 202. As discussed previously, plate 210 includes holes through which the refrigerant in chamber 216 can flow to chamber 218. The holes in plate 210 are angled in an opposite direction relative to the holes in plate 208. As a result, the holes in plate 210 reverse the direction of rotation of the refrigerant. In the example of FIG. 2A, plate 210 reverses the direction of rotation of the refrigerant such that the refrigerant entering chamber 218 rotates in a clockwise direction about longitudinal axis 220. In certain embodiments, this reversal in the direction of rotation may cause additional oil to be separated from the refrigerant. Furthermore, as discussed previously, the holes in plate 210 reduce the surface area (e.g., relative to the cross-sectional area of body 202) through which the refrigerant flows from chamber 216 to 218. As a result, the velocity of the refrigerant increases as the refrigerant flows through the holes of plate 210, which allows the refrigerant to continue flowing downwards through chamber 218.

This disclosure contemplates that the refrigerant may rotate in any suitable direction in chambers 214, 216 and 218. For example, the refrigerant in chambers 214 and 216 may rotate about longitudinal axis 220 in a clockwise direction, and the refrigerant in chamber 218 may rotate about longitudinal axis 220 in a counterclockwise direction. The angle of the holes in plates 208 and 210 may be reversed to provide this opposite direction of rotation down body 202.

Mesh 222 may be positioned within chambers 216 and 218 to separate or filter an oil out from the refrigerant. Mesh 222 may be coupled to the sidewalls of body 202 in chambers 216 and 218. As the refrigerant rotates downwards through chambers 216 and 218 the refrigerant may interact or pass through mesh 222. As the refrigerant passes through mesh 222, mesh 222 may capture an oil from the refrigerant. The captured oil may then flow down towards the bottom of body 202.

Mesh 224 is positioned within chamber 218 near the bottom of body 202. In the example of FIG. 2A, mesh 224 may be positioned about longitudinal axis 220. Outlet 212 may be positioned within mesh 224. As the refrigerant in chamber 218 rotates downwards, the refrigerant may pass through mesh 224 on its way to outlet 212. Mesh 224 may capture or filter out an oil in the refrigerant as the refrigerant passes through mesh 224. The separated oil may then flow towards the bottom of body 202.

Outlet 212 is positioned along longitudinal axis 220. Outlet 212 begins in chamber 218 and extends upwards through chamber 216 and 214. Outlet 212 extends through the top surface of body 202 to direct refrigerant away from oil separator 110 (e.g., to high side heat exchanger 102). Refrigerant in chamber 218 passes through mesh 224 and into outlet 212. The refrigerant then rises upwards through outlet 212 and away from oil separator 110 (e.g., to high-side heat exchanger 102).

Oil 228 that is separated from the refrigerant is collected at the bottom of body 202. In this manner, body 202 acts as an oil reservoir. Because the oil reservoir is effectively integrated with body 202, oil separator 110 occupies less space than conventional oil separator designs that include a separate oil reservoir. The collected oil 228 may be removed from body 202 through drain 226 and/or outlet 230. For example, drain 226 may be open to allow oil 228 to flow out of body 202 through drain 226. As another example, oil 228 may be sucked out of body 202 through outlet 230. The removed oil 228 may then be added back to other components of system 100 (e.g., compressor 108).

Sight glasses 232 allow a person to look within chamber 218 to determine a level of oil 228 within chamber 218. If a person determines that a level of oil within body 202 is too high, the person may extract the oil 228 using drain 226 and/or outlet 230. In certain embodiments, sight glasses 232 may further include a level sensor that detects the level of oil 228 within body 202. When the level of oil 228 in chamber 218 rises above a certain threshold, the level sensor may trigger an alert or warning (e.g., illuminating a light, communicating a message, etc.) so that a person can be made aware of the oil 228 level. In some embodiments, a separate oil extraction system may automatically activate to extract oil 228 from chamber 218 when the level sensor triggers.

FIG. 2B illustrates the configuration of certain components of oil separator 110. As seen in FIG. 2B plate 208 is positioned above plate 210 and outlet 212 extends vertically through plates 208 and 210. Plate 208 includes holes 234 that are angled in a first direction to maintain a direction of rotation of a refrigerant. Plate 210 includes holes 236 that are angled in a direction that is opposite holes 234. In this manner, plate 210 and/or holes 236 reverse the direction of rotation of the refrigerant.

FIGS. 2C through 2E illustrate the structure of plates 208 and 210. FIG. 2C shows a top-down view of plates 208 and 210. As seen in FIG. 2C, plates 208 and 210 may be a circular plate that includes holes 234 and/or 236 distributed around a perimeter of plates 208 and 210. In some embodiments, holes 234 and/or 236 are tangential to the edge of plates 208 and 210. Plates 208 and 210 and holes 234 and 236 may be any suitable shape (e.g., other than circular). For example, plates 208 and 210 may be rectangular to conform to a rectangular body 202. Additionally, holes 234 and 236 may be rectangular and/or triangular. Refrigerant entering holes 234 and/or 236 are directed to rotate in a particular direction depending on the angle of holes 234 and/or 236. In the examples of FIGS. 2D and 2E, holes 234 are angled such that refrigerant flowing through holes 234 will rotate in a counterclockwise direction, and holes 236 are angled such that refrigerant flowing through holes 236 will rotate in a clockwise direction.

Plates 208 and 210 further include a hole 235 near the middle of plates 208 and 210. Hole 235 allows outlet 212 to extend through plates 208 and 210 so that outlet 212 can extend to the top of oil separator 110. As a result, refrigerant in oil separator 110 flows through outlet 212 through the centers of plates 208 and 210 enroute to exiting oil separator 110.

FIGS. 2D and 2E show a side-view of plates 208 and 210. FIG. 2D shows a side-view of plate 208. As seen in FIG. 2D holes 234 extend through plate 208 and are angled in a first direction. FIG. 2E shows a side-view of plate 210. As seen in FIG. 2E holes 236 extend through plate 210 and are angled in a second direction that is opposite the direction of holes 234 in plate 208. Although this disclosure shows holes 234 and 236 being angled in a particular direction, this disclosure contemplates holes 234 and 236 being angled in any suitable direction.

FIGS. 2F and 2G show embodiments that include an apparatus 242 coupled to one or more of plates 208 and 210. Generally, apparatus 242 increases the velocity of the refrigerant in body 202 during low mass flow conditions. During low mass flow conditions, the refrigerant within body 202 may not have enough velocity for the refrigerant to rotate downwards (e.g., into chambers 216 and/or 218) and up outlet 212. Apparatus 242 may be included in oil separator 110 to further increase the velocity of the refrigerant during low mass conditions. Generally, apparatus 242 covers a portion of holes 234 and/or 236 to further reduce the cross-sectional area through which refrigerant can flow through plates 208 and/or 210. As a result, the velocity of the refrigerant further increases as the refrigerant flows through plates 208 and/or 210. Apparatus 242 includes a spring mechanism that compresses due to pressure from the refrigerant during high mass flow conditions. When compressed during high mass flow conditions, apparatus 242 covers less of holes 234 and/or 236. As a result, apparatus 242 increases the cross-sectional area through which refrigerant flows through plates 208 and/or 210 as the velocity and/or pressure of the refrigerant increases.

FIG. 2F illustrates an embodiment where apparatus 242 is coupled to a top surface 238 of plate 208. As seen in FIG. 2F, apparatus 242 includes a coupler 244, a spring 246, and a cover 248. Coupler 244 couples apparatus 242 to plate 208. For example, coupler 244 may include a screw that fastens apparatus 242 to top surface 238 of plate 208. Coupler 244 may use any suitable fastener (e.g., bolt, nail, staple, adhesive, etc.) to secure apparatus 242 to plate 208.

Spring 246 is coupled to coupler 244 and cover 248 is coupled to spring 246. Generally, apparatus 242 is positioned on plate 208 such that cover 248 covers a portion of a hole 234 in plate 208. By covering a portion of hole 234, cover 248 further reduces the surface area through which the refrigerant passes through plate 208. As a result, the velocity of the refrigerant further increases when cover 248 covers a portion of hole 234. During low mass flow conditions, cover 248 covers a portion of hole 234 to further increase the velocity of the refrigerant flowing through hole 234. When the low mass flow condition ends or during a high mass flow condition, the refrigerant has sufficient velocity and pressure to push on cover 248 and spring 246. As a result, spring 246 compresses, cover 248 covers less of hole 234, and the surface area through which the refrigerant passes through plate 208 increases. In this manner, apparatus 242 automatically adjusts for different mass flow conditions within body 202.

FIG. 2G shows an alternative embodiment in which coupler 244 is coupled a bottom surface 240 of plate 208. Coupler 244 may couple apparatus 242 to bottom surface 240 of plate 208. Similar to the example of FIG. 2F, apparatus 242 covers a portion of hole 234 during low mass flow conditions. During high mass flow conditions the refrigerant pushes on cover 248 to compress spring 246 such that apparatus 242 covers less of hole 234.

Although, FIGS. 2F and 2G show apparatus 242 coupled to plate 208, apparatus 242 may be coupled to any one of plates 208 and 210. For example, apparatus 242 may be coupled to a top surface or a bottom surface of plate 210. Additionally, each plate 208 and/or 210 may include any suitable number of apparatuses 242. For example, each plate 208 and/or 210 may include one apparatus 242 for each hole 234 and/or 236. As another example, each plate 208 and/or 210 may include one apparatus 242 for every other hole 234 and/or 236. As yet another example, each plate 208 and/or 210 may include only one apparatus 242 that covers a portion of only one hole 234 and/or 236.

FIG. 3 is a flowchart illustrating an example method 300 of operating oil separator 110 of the system 100 of FIG. 1. Generally, various components of oil separator 110 perform the steps of method 300. In particular embodiments, by performing method 300, an oil is separated from refrigerant flowing through oil separator 110.

Inlet 204 directs refrigerant into a first chamber 214 in step 302. The refrigerant may be supplied by compressor 108. As the refrigerant enters first chamber 214, the refrigerant may rotate about a longitudinal axis 220 of oil separator 110. For example, the refrigerant may rotate in a counterclockwise direction about longitudinal axis 220. As more refrigerant enters first chamber 214 through inlet 204, the rotating refrigerant may be pushed downwards towards a plate 208.

In step 304, plate 208 directs the refrigerant from the first chamber 214 into a second chamber 216. Plate 208 may include holes 234 that are angled to maintain the direction of rotation of the refrigerant. In this manner, the refrigerant in the second chamber 216 may rotate about longitudinal axis 220 in the same direction as the refrigerant in first chamber 214. The refrigerant in the second chamber 216 may rotate downwards towards a second plate 210.

In step 306, plate 210 directs the refrigerant from the second chamber 216 into a third chamber 218. Plate 210 may include holes 236 that are angled in a direction that reverses the direction of rotation of the refrigerant. As a result, the refrigerant entering the third chamber 218 rotates about longitudinal axis 220 in a direction opposite from the direction of the refrigerant in chambers 214 and 216. This reversal in the direction of rotation may cause additional oil to be separated from the refrigerant.

Outlet 212 directs refrigerant upwards in step 308. Outlet 212 may direct the refrigerant in the third chamber 218 upwards through chambers 214 and 216, and ultimately out oil separator 110. Body 202 of oil separator 110 collects an oil separated from the refrigerant in step 310. The oil may have been separated from the refrigerant in the second chamber 216 and the third chamber 218. In certain embodiments, meshes 222 and 224 may separate additional oil from the refrigerant in chamber 216 and 218. The separated oil is collected at the bottom of body 202. As a result, an oil reservoir is effectively integrated with body 202. In this manner, body 202 and oil separator 110 occupy less space than conventional designs that include an unintegrated oil reservoir.

Modifications, additions, or omissions may be made to method 300 depicted in FIG. 3. Method 300 may include more, fewer, or other steps. For example, steps may be performed in parallel or in any suitable order. While discussed as various components of oil separator 110 performing the steps, any suitable component or combination of components of system 100 and oil separator 110 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An oil separator comprising:
a vertical body;
a first plate positioned within the vertical body, the first plate defining a first chamber within the vertical body;
a second plate positioned within the vertical body, the second plate and the first plate defining a second chamber within the vertical body, the second plate further defining a third chamber within the body, the second chamber below the first chamber, the third chamber below the second chamber;
an inlet configured to direct a refrigerant into the vertical body and into the first chamber, the refrigerant in the first chamber rotates in a first direction about a longitudinal axis of the vertical body, the first plate configured to direct the refrigerant in the first chamber into the second chamber such that the refrigerant in the second chamber rotates in the first direction about the longitudinal axis of the vertical body and downwards towards the second plate, the second plate configured to direct the refrigerant in the second chamber into the third chamber such that the refrigerant in the third chamber rotates in a second direction about the longitudinal axis of the vertical body and downwards towards a bottom of the vertical body, the second direction opposite the first direction;

a first mesh positioned at the bottom of the vertical body extending upwards within the third chamber and about the longitudinal axis of the vertical body configured to separate an oil from the refrigerant as the refrigerant passes through the first mesh towards an outlet; and the outlet positioned along the longitudinal axis of the vertical body and within the first mesh, the outlet configured to direct the refrigerant in the third chamber upwards through the first and second chambers and out of the vertical body.

2. The oil separator of claim 1, wherein:

the first plate defines a first plurality of holes that extend through the first plate, the refrigerant in the first chamber flows into the second chamber through the first plurality of holes, each hole of the first plurality of holes is angled such that the refrigerant in the first chamber that flows through the first plurality of holes continues rotating in the first direction; and the second plate defines a second plurality of holes that extend through the second plate, the refrigerant in the second chamber flows into the third chamber through the second plurality of holes, each hole of the second plurality of holes is angled such that the refrigerant in the second chamber that flows through the second plurality of holes begins rotating in the second direction.

3. The oil separator of claim 2, further comprising an apparatus coupled to the first plate, the apparatus comprising:

a spring; and a cover coupled to the spring, the cover covering a first portion of a hole of the first plurality of holes, the cover and the spring configured to move such that the cover covers a second portion of the hole of the first plurality of holes when a mass flow of the refrigerant in the first chamber increases, the second portion is smaller than the first portion.

4. The oil separator of claim 3, wherein the apparatus is coupled to a top surface of the first plate.

5. The oil separator of claim 3, wherein the apparatus is coupled to a bottom surface of the first plate.

6. The oil separator of claim 1, further comprising a second mesh positioned within at least one of the second and third chambers, the second mesh configured to separate the oil from the refrigerant as the refrigerant rotates down at least one of the second and third chambers.

7. The oil separator of claim 1, wherein the third chamber is configured to collect the oil separated from the refrigerant in the second and third chambers.

8. A method comprising:

directing, by an inlet, a refrigerant into a first chamber of a vertical body such that the refrigerant in the first chamber rotates in a first direction about a longitudinal axis of the vertical body, the first chamber defined by a first plate positioned in the vertical body;

directing, by the first plate, the refrigerant in the first chamber into a second chamber of the vertical body such that the refrigerant in the second chamber rotates in the first direction about the longitudinal axis of the vertical body, the second chamber defined by the first plate and a second plate positioned in the vertical body, the second chamber below the first chamber;

directing, by the second plate, the refrigerant in the second chamber into a third chamber of the vertical body such that the refrigerant in the third chamber rotates in a second direction about the longitudinal axis of the vertical body, the second direction opposite the first direction, the third chamber below the second chamber;

separating, by a first mesh positioned at the bottom of the vertical body extending upwards within the third chamber and about the longitudinal axis of the vertical body, an oil from the refrigerant as the refrigerant passes through the first mesh towards an outlet; and directing, by the outlet positioned along the longitudinal axis of the vertical body, the refrigerant in the third chamber upwards through the first and second chambers and out of the vertical body.

9. The method of claim 8, wherein:

the first plate defines a first plurality of holes that extend through the first plate, the refrigerant in the first chamber flows into the second chamber through the first plurality of holes, each hole of the first plurality of holes is angled such that the refrigerant in the first chamber that flows through the first plurality of holes continues rotating in the first direction; and the second plate defines a second plurality of holes that extend through the second plate, the refrigerant in the second chamber flows into the third chamber through the second plurality of holes, each hole of the second plurality of holes is angled such that the refrigerant in the second chamber that flows through the second plurality of holes begins rotating in the second direction.

10. The method of claim 9, wherein an apparatus is coupled to the first plate, the apparatus comprising:

a spring; and a cover coupled to the spring, the cover covering a first portion of a hole of the first plurality of holes, the cover and the spring configured to move such that the cover covers a second portion of the hole of the first plurality of holes when a mass flow of the refrigerant in the first chamber increases, the second portion is smaller than the first portion.

11. The method of claim 10, wherein the apparatus is coupled to a top surface of the first plate.

12. The method of claim 10, wherein the apparatus is coupled to a bottom surface of the first plate.

13. The method of claim 8, further comprising separating, by a second mesh positioned within at least one of the second and third chambers, the oil from the refrigerant as the refrigerant rotates down at least one of the second and third chambers.

14. The method of claim 8, further comprising collecting, by the third chamber, the oil separated from the refrigerant in the second and third chambers.

15. A system comprising:

a high side heat exchanger configured to remove heat from a refrigerant;

a low side heat exchanger configured to use the refrigerant to remove heat from a space proximate the low side heat exchanger;

a compressor configured to compress the refrigerant from the low side heat exchanger; and an oil separator configured to separate an oil from the refrigerant from the compressor, the oil separator comprising:

a vertical body;

a first plate positioned within the vertical body, the first plate defining a first chamber within the vertical body;

a second plate positioned within the vertical body, the second plate and the first plate defining a second chamber within the vertical body, the second plate further defining a third chamber within the body, the second chamber below the first chamber, the third chamber below the second chamber;

an inlet configured to direct the refrigerant into the vertical body and into the first chamber, the refrigerant in the first chamber rotates in a first direction about a longitudinal axis of the vertical body, the first plate configured to direct the refrigerant in the first chamber into the second chamber such that the refrigerant in the second chamber rotates in the first direction about the longitudinal axis of the vertical body and downwards towards the second plate, the second plate configured to direct the refrigerant in the second chamber into the third chamber such that the refrigerant in the third chamber rotates in a second direction about the longitudinal axis of the vertical body and downwards towards a bottom of the vertical body, the second direction opposite the first direction;

a first mesh positioned at the bottom of the vertical body extending upwards within the third chamber and about the longitudinal axis of the vertical body configured to separate the oil from the refrigerant as the refrigerant passes through the first mesh towards an outlet; and the outlet positioned along the longitudinal axis of the vertical body and within the first mesh, the outlet configured to direct the refrigerant in the third chamber upwards through the first and second chambers and out of the vertical body.

16. The system of claim 15, wherein:

the first plate defines a first plurality of holes that extend through the first plate, the refrigerant in the first chamber flows into the second chamber through the first plurality of holes, each hole of the first plurality of holes is angled such that the refrigerant in the first chamber that flows through the first plurality of holes continues rotating in the first direction; and the second plate defines a second plurality of holes that extend through the second plate, the refrigerant in the second chamber flows into the third chamber through the second plurality of holes, each hole of the second plurality of holes is angled such that the refrigerant in the second chamber that flows through the second plurality of holes begins rotating in the second direction.

17. The system of claim 16, wherein the oil separator further comprises an apparatus coupled to the first plate, the apparatus comprising:

a spring; and a cover coupled to the spring, the cover covering a first portion of a hole of the first plurality of holes, the cover and the spring configured to move such that the cover covers a second portion of the hole of the first plurality of holes when a mass flow of the refrigerant in the first chamber increases, the second portion is smaller than the first portion.

18. The system of claim 17, wherein the apparatus is coupled to a top surface of the first plate.

19. The system of claim 17, wherein the apparatus is coupled to a bottom surface of the first plate.

20. The system of claim 15, wherein the oil separator further comprises a second mesh positioned within at least one of the second and third chambers, the second mesh configured to separate the oil from the refrigerant as the refrigerant rotates down at least one of the second and third chambers.

* * * * *